United States Patent Office 3,673,005
Patented June 27, 1972

3,673,005
PROCESS FOR BORATING METALS, ESPECIALLY STEEL
Helmut Kunst, Niedersachsen, Germany, assignor to Elektroschmelzwerk Kempten G.m.b.H., Munich, Bavaria, Germany
No Drawing. Filed Sept. 18, 1969, Ser. No. 859,172
Int. Cl. C23c 9/04
U.S. Cl. 148—6                    5 Claims

ABSTRACT OF THE DISCLOSURE

Process for borating metals in which the metal is treated with a pulverized borating agent containing a fluoborate and/or boron fluoride as an accelerating agent.

BACKGROUND OF THE INVENTION

Borating is a process for treating the surfaces of metals, especially steel, as a result of which metals are provided with hard, wear-resistant surface layers.

In practice borating has been attracting great interest for quite some time, and so far a number of borating processes have been made known. All such processes are based on chemical or electrochemical reactions between a boron-yielding agent and a metal, like iron, at a temperature slightly above 600° C. The boron-yielding agent may be gaseous, liquid or solid, depending on the type of process.

Borating in a gaseous phase, i.e. using gaseous borating agents, could only be performed in particular cases, so far, for economic and technical reasons. Boron halides, diborane and also certain boron compounds, inorganic and organic, like $BCl_3$, B, $Br_3$, $(CH_3)_3B$ and $(C_2H_5)_3B$, either in purified form or in a strong hydrogen solution, can be used as gaseous boron-yielding agents. Apart from the fact that all gaseous borating agents are extremely expensive, in certain instances their handling or manipulation (for instance with diborane) is rather difficult because of their high toxicity. The hard surface layers thus produced are often porous and contain considerable quantities of corrosion products. It may be said, quite as a matter of fact, that borating processes using gaseous borating agents have not justified themselves and, therefore, have not been able to find any practical application.

Working with liquid borating agents, one has three possibilities, namely borating in fused salt baths with or without electrolysis, and in aqueous solutions under high-frequency heating. Although the first two processes are in fact very economical, there is a drawback in their use, because of the melting film left over on the metal work piece, which does not wash off easily, because of an unsatisfactory temperature adjustability, because of the corrosion of crucible materials, and because of a shadow effect (when electrolysis is used). The third process, namely borating in aqueous solutions, has not brought about any practical results of importance because the reactivity of many boron compounds with water for this kind of work requires the exclusive use of borax and an anhydride of boric acid, while no boron potential can be achieved with such compounds that may bring about the diffusion of a sufficient quantity of boron into the surface. Consequently, no firm and resistant compound layer can form on the work piece.

In the borating process where solid borating agents were used, first a so-called paste borating was employed, i.e. a paste made of boron carbide, cryolite ($Na_3AlF_6$) as the liquid agents and of a binding agent was applied on the work piece. The thus applied paste was then allowed to dry whereupon it was heated in a high-frequency inductor, i.e. for about 3 minutes to a temperature of 1200° C. The advantage this process offers resides in the fact that the time of treatment is cut, and it is also possible to conduct partial borating. The drawback of this process most certainly is to be recognized in the fact that the powder particles originating from the borating agent are welded over the surfaces, and this causes a very poor surface condition.

Whereas none of the above-described processes has proved to be entirely satisfactory in practice, more attention has been recently devoted to borating with pulverized borating agents, despite the fact that earlier attempts in this direction had demonstrated that this method could only lead to thin, porous layers. Experiments using amorphous boron alone or in a mixture with aluminum oxide as a diluting agent managed to produce sufficiently strong layers, which were not devoid of flaws though, and then only when protective and/or activating gases, like hydrogen, were used or when a state of vacuum was induced. Furthermore, it was necessary to maintain extremely high borating temperatures and very long borating times. Still, this process appeared to be attractive because of the low outlays for the machinery needed for it.

It has already been suggested in the past that if the process of borating wtih pulverized borating agents is to be improved, the pulverized borating agents should be used in conjunction with an accelerator. It is known, for instance, that amorphous boron can be activated by means of ammonium chloride. But even so, a long time at high temperatures was required for its treatment before layers of sufficient thickness could be achieved, even after activation. Consequently, what may also be stated regarding borating with pulverized borating agents is that this process is not satisfactory either, for economic and technical reasons, as a result of the high annealing temperatures and the long time it takes to anneal.

SUMMARY OF THE INVENTION

The task of the present invention was to find the kind of accelerators that would facilitate the achievement of technically usable layer thicknesses at shorter annealing times and/or lower annealing temperatures while borating with pulverized agents.

This task has been solved by the invention through the use of a group of compounds as accelerators and consequently by bringing about the elimination of the previously described drawbacks. The group of compounds provided by the invention which involves the addition of pulverized borating agents as accelerators, comprises fluoborates and/or boron fluoride.

It is true that the use of fluoborates is known for borating in the liquid phase, for instance in salt baths, but the kind of behavior and operation of fluoborates in those processes is completely different. When borating is done, in salt baths, the latter consist of salts or salt mixtures which are in a liquid state at the treatment temperatures used in the present invention, at which elementary boron can be dissolved or dispersed. As to the salt serving in a melted state as the solvent for elementary boron, this can also be fluoborate. Apart from the fundamental differences of the two processes, i.e. between borating with fused salts with dissolved boron and borating with pulverized borating agents where fluoborates are to be added in accordance with the present invention, the modus operandi of the fluoborate in one and the other of the mentioned process is completely different. This is, for instance, the case when fluoborates are used as solvents whose high speed of decomposition acts in a very destructive manner. However, when borating is done with pulverized borating agents, it is just this rapid decomposition of the fluoborates, as I have now discovered, that makes them valuable as accelerators for this process. The effect of this working method lies most emphatically in the speed at which the reaction can be put in motion. Consequently, the use of fluoborates as accelerators for powdered borating agents must be considered as an absolute innovation, since it results in previously unforseen considerable advantages, as is demonstrated clearly below.

The invention deals with the use of fluoborates as accelerators for pulverized borating agents or mixtures in borating metals, especially steel. The term pulverized borating agents is understood to mean ferroboron, amorphous boron, boron carbide or borax or a mixture of these substances.

While powdery borating agents with accelerator capacity are the subject of this invention, particularly for borating steel, it also covers other metals when they are made up of boron carbide and a fluoborate as the activitor. The invention also allows for the use of mixtures of boron carbide and borax, ferroboron or amorphous boron, instead of boron carbide only.

If necessary, aluminum oxide can be added as a diluting agent to the substances or mixtures of substances serving as borating agents and activated with fluoborates. This diluting agent is to prevent the caking of the powder.

DESCRIPTION OF THE PREFERRED EMBODIMENTS

It is preferable to use sodium, potassium or ammonium fluoborates as fluoborates which are to be added as accelerators.

The invention provides for use of the accelerators in borating agents in quantities of 1 to 10 weight percent, preferably about 5 percent, referred to the borating agent. The most preferred operational formula of the invention for use as a borating agent most excellently suited to borate metals, especially steel, calls for 75–85 weight percent, preferably 79 weight percent, of boron carbide, 10–20 weight percent, preferably 16 weight percent, of borax, and 1 to 10 weight percent, preferably 5 weight percent, of fluoborate, as the accelerator.

By using fluoborates as accelerators in powdery borating agents in accordance with the invention it becomes possible to increase considerably the layer thickness, in all heretofore known processes working with pulverized borating agents, as compared with the layer thickness obtainable in working with non-activated borating agents. Furthermore it is possible to produce an equally strong boride layer in a considerably shorter time and at lower borating temperatures. The accelerators employed according to the invention, i.e. the fluoborates, when used in the form of pulverized borating agents, also produce a stronger activation than the activators so far known, for instance ammonium chloride.

How the accelerator is effective depends on the kind of borating agents in use. As it was presently possible to determine, the most effective accelerators are in ferroboron and boron carbide-borax mixtures, while they are less effective though still better than other known accelerators, in amorphous boron and mixtures containing amorphous boron.

Fundamentally speaking, any kind of fluoborate can be used, although it has been demonstrated that alkali fluoborates like sodium fluoborate, $NaBF_4$, or potassium fluoborate, $KBF_4$, and ammonium fluoborate, $(NH_4)BF_4$, are much better suited than alkaline earth and heavy metal fluoborates.

The operational example given below will serve as further clarification of the invention.

EXAMPLE

As a comparative study a piece of low carbon steel was first borated in a mixture made up of 84 weight percent of boron carbide, $B_4C$, and 16 weight percent of borax, $Na_2B_4O_7$. When, for instance, a work piece of steel is treated in this non-activated mixture for 6 hours at 1000° C., the product is a highly irregular layer with a thickness ranging from 0.060 to 0.180 mm.

Subsequently another borating experiment was performed and exactly the same kind of work piece was also treated in a mixture of boron carbide and borax, but this time the mixture had been activated with potassium fluoborate. The activated borating agent showed a composition of 79 weight percent $B_4C$, 16 weight percent of $Na_2B_4O_7$ and 5 weight percent of $KBF_4$. All other treatment conditions remaining exactly as above, a regular layer formed, having a thickness of 0.240 mm.

This shows that thanks to the process of the invention it is possible to obtain a considerable and previously unforseen improvement when borating with pulverized borating agents.

The invention claimed is:

1. Process for borating metals, which comprises heating the metal in a pulverized borating agent selected from the group consisting of ferroboron, amorphous boron, boron carbide, borax and mixtures of said substances, containing an accelerating agent selected from the group consisting of fluoborates and boron fluoride in quantities of 1 to 10 weight percent referred to the borating agent.

2. Process according to claim 1, in which the accelerating agent is selected from the group consisting of sodium fluoborate, potassium fluoborate and ammonium fluoborate.

3. Process according to claim 1, in which the heating of the metal is performed in a mixture consisting of 75–85 weight percent boron carbide, 10–20 weight percent borax, and 1–10 weight percent of fluoborate.

4. A pulverized borating substance for borating metals, consisting essentially of a mixture of at least one substance selected from the group consisting of ferroboron, amorphous boron, boron carbide and borax, and an accelerator selected from the group consisting of fluoborates and boron fluoride in quantities of 1 to 10 weight percent referred to the borating agent.

5. A pulverized borating substance according to claim 4, which also contains aluminum oxide.

References Cited

UNITED STATES PATENTS

| 2,984,605 | 5/1961 | Cooper | 117—Boron |
| 3,029,162 | 4/1962 | Samuel et al. | 117—107 |
| 3,090,702 | 5/1963 | Commanday et al. | 117—106 A |

RALPH S. KENDALL, Primary Examiner

U.S. Cl. X.R.

148—6.35